(12) United States Patent
Bohle

(10) Patent No.: US 6,614,528 B1
(45) Date of Patent: Sep. 2, 2003

(54) SIMULTANEOUS DOUBLE GRATING SPECTROMETER WITH SOLID-STATE SENSORS OR PHOTOMULTIPLIER TUBES

(75) Inventor: Wolfram Bohle, Kleve (DE)

(73) Assignee: SAI Gesellschaft fur analytische MeBgerate mbH, Kleve (DE)

( * ) Notice: Subject to any disclaimer, the term of this patent is extended or adjusted under 35 U.S.C. 154(b) by 0 days.

(21) Appl. No.: 09/447,171

(22) Filed: Nov. 22, 1999

(30) Foreign Application Priority Data

Nov. 21, 1998 (DE) .......................... 198 53 754

(51) Int. Cl.⁷ ................................. G01J 3/12
(52) U.S. Cl. ....................................... 356/328
(58) Field of Search ................. 356/326, 305, 356/328, 333, 334; 250/339, 372; 385/24, 45

(56) References Cited

U.S. PATENT DOCUMENTS

| | | | |
|---|---|---|---|
| 4,571,074 A | | 2/1986 | Thevenon |
| 4,697,924 A | | 10/1987 | Akiyama |
| 5,228,103 A | * | 7/1993 | Chen et al. ............. 385/14 |
| 5,274,435 A | | 12/1993 | Hettrick |
| 5,371,813 A | * | 12/1994 | Artigue ................. 385/24 |

FOREIGN PATENT DOCUMENTS

| | | |
|---|---|---|
| DE | 1106518 | 5/1961 |
| DE | 26 56 119 C2 | 6/1977 |
| DE | 36 21 464 C2 | 1/1987 |
| DE | 44 10 036 A1 | 9/1995 |
| DE | 195 23 140 A1 | 1/1997 |
| DE | 196 09 916 A1 | 9/1997 |

OTHER PUBLICATIONS

Japan Abstract JP 0110014570 AA. vol. 8, No. 38.
Japan Abstract JP 0060102399 AA. vol. 8, No. 38.
Bartoe et a l., "New Stigmatic, Coma–Free Concave–grating spectrograph", Journal of the Optical Society of America, vol. 65, No. 1, Jan. 1975; 13–20.

* cited by examiner

Primary Examiner—Frank G. Font
Assistant Examiner—Tu T. Nguyen
(74) Attorney, Agent, or Firm—Woodbridge & Associates, P.C.; Richard C. Woodbridge; Thomas J. Onka

(57) ABSTRACT

In order to extend the available spectral range and to optimize spectral resolution while retaining a compact spectrometer setup, two diffraction gratings are operated with congruent focal curves in a Paschen-Runge geometry. The spectrometer features only one entrance slit and allows an adequate adaptation of the covered spectral range to the demands of analytical spectrometry. Apart from photomultiplier tubes commercial solid-state linear array sensors placed tangential at the Rowland circle are used for simultaneous detection of the spectrum. By employing angular cut cylindrical mirrors the radiation is deflected by 90% upward or downward in an alternating series. In this way two effects are achieved, an almost complete detection of the spectrum firstly and secondly a gain of intensity by focusing of radiation perpendicular to the plane of dispersion.

12 Claims, 2 Drawing Sheets

SIMULTANEOUS DOUBLE GRATING SPECTROMETER WITH SOLID-STATE SENSORS OR PHOTOMULTIPLIER TUBES

CROSS-REFERENCE TO RELATED APPLICATIONS

Not applicable.

STATEMENT REGARDING FEDERALLY SPONSORED RESEARCH OR DEVELOPMENT

Not applicable.

REFERENCED COMPUTER PROGRAM LISTINGS

Not applicable.

BACKGROUND OF THE INVENTION

1. Field of the invention

This invention relates to analytical spectrometry. In particular this invention relates to compact high resolution spectrometry by the simultaneous use of two gratings with either solid-state sensors or photomultiplier tubes.

2. Description of the Related Art

For some time now, the Paschen-Runge setup has been used in analytical spectrometry On the whole it appears due to the fact that diffraction and image formation is accomplished by a single optical element—a concave grating.

With a given number of grooves per mm and entrance angle a specific spectral section is imaged on the Rowland circle. At the same time the spectral resolution which strongly affects the lower detection limit in spectrometry is determined by the diameter of the Rowland circle and the dispersion of the grating.

The application of large Rowland diameters is in contrast to the demands for a modem compact spectrometer design. Therefor, the spectral resolution needed is preferably achieved by using a large number of grooves per mm. The available spectral range then results from the chosen length of the Rowland circle arc.

Current Paschen-Runge spectrometers using a single diffraction grating retain some drawbacks because of the following facts:

1. Image distortions strongly increase at high diffraction angles deteriorating the spectral resolution. The useable length of the Rowland circle arc and resulting spectral range will thus be reduced.
2. Only a continuous, coherent spectral section can be imaged, so that areas along the Rowland curve may be occupied by wavelength regions which are of no interest for analytical purposes.

The restrictions stated in 1 and 2 often lead to a division of the entire spectral range applying several spectrometer units.

3. Commercial solid-state linear array sensors come in standardized chip carrier packages, the dimensions of which are much larger than the radiation "sensitive" part of the chips. In order to avoid substantial gaps in the detection of the spectrum the sensors must overlap along the focal curve. This can be done either by inclination of the linear arrays to the plane of dispersion (see Deutsches Patentamt, Offenlegungschrift DE 195 23 140 A1, "Mehrkanal-Spektrometer mit Zeilensensor") or by overlapping of horizontally oriented sensor chip carriers. In both cases, the array sensors with regard to the entire detect radiation several millimeters above or below the plane of dispersion. However, in these regions the imaging physics of the Rowland setup causes increased aberrations, resulting in a reduction of the spectral resolution.

BRIEF SUMMARY OF THE INVENTION

Consequently, the features of the invention are;
1. Realization of a single spectrometer unit in which different spectral ranges and corresponding dispersions can be adapted to the requirements of the analytical task.
2. Realization of a detector arrangement along the focal curve through which
    (a) only the radiation close to the dispersion plane will be detected thus optimum spectral resolution is guaranteed,
    (b) a nearly complete detection of the available spectrum is possible using commercial solid-state linear array sensors.

DETAILED DESCRIPTION OF THE INVENTION

Figure 1:
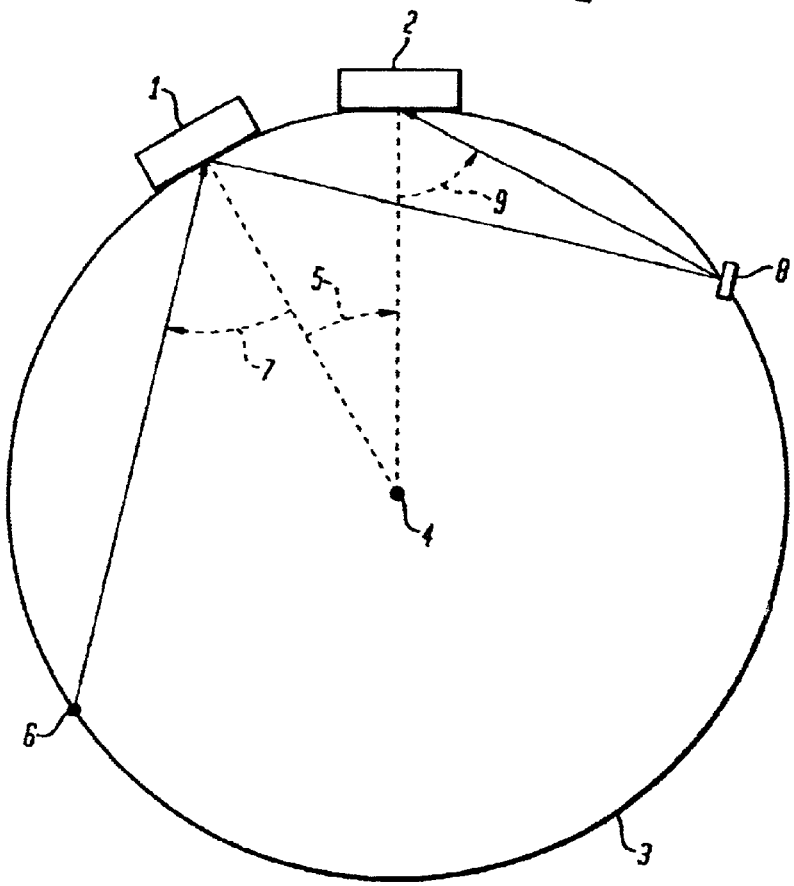
FIG. 1 is a schematic plane view showing one embodiment of the invention with the entrance slit, two gratings and plane reflecting mirror all mounted on a Rowland Circle.

According to the invention, instead of one diffraction grating two diffraction gratings [1, 2] (FIG. 1) are used on the same Rowland circle. The geometrical dimensions and the radii of curvature of the two gratings are the same the number of grooves per millimeter, however, can differ.

The gratings are adjusted in a way that their focal curves are congruent to a joint Rowland circle [3] (claim 1). The grating normal lines intersect in the center of the Rowland circle [4] to form the angle δ [5] which describes the distance of the two gratings.

The spectrometer features only one entrance slit [6] through which the first grating [1] is illuminated with the entrance angle $\alpha_1$ [7]. At the image point of the entrance slit in zero diffraction order there is a plane tilted mirror [8] that reflects the radiation onto the second grating [2]. In this way the image of the entrance slit produced by the first grating acts as a virtual entrance slit for the second grating observed under the entrance angle $\alpha_2$ [9] (claim 2). Conditional on symmetry the equation $$\alpha_2 = -(\alpha_1 + \delta/2)$$

applies. Choosing magnitude and sign of $\alpha_1$ and δ as well as the two grating constants different spectral ranges with different dispersions can be imaged simultaneously in $1^{st}$ order on any section of the Rowland circle (claim 3) with the exception of those spots where gratings themselves, the entrance slit and the tilted mirrors are situated. The variety of spectral combinations further increase with the use of higher orders of diffraction.

Normally, if we consider a Rowland section the radiation diffracted by only one of the two gratings is of interest. By masking the undesired radiation separated sections of the Rowland circle are reserved at a time for each grating creating two areas of operation with either separated or overlapping spectral ranges. The two spectral ranges and corresponding dispersions are chosen to meet the respective analytical demands.

Of special advantage are those configurations in which $\alpha_1$ and $\alpha_2$ have opposite sign. In this case aberrations within the image formation by the second grating will be considerably compensated (claim 4). As a result there are two advantages for the operation of the second grating:

(a) Higher entrance angles and diffraction angles can be operated, while keeping spectral resolution.

(b) Due to better image quality the radiation density in the image plane is higher, thus so is the signal intensity.

There is an additional benefit when the spectral range of operation for the second grating is of longer wavelengths than the critical wavelength of the first grating (claim 5). The critical wavelength of a reflection grating term the wavelength for which the diffraction angle in $1^{st}$ order is 90°. Radiation with longer wavelengths suffer only the zero order diffraction. The first grating in this way acts as a concave mirror, the radiation energy intended far the second grating is not dissipated by the first grating.

Figure 2:
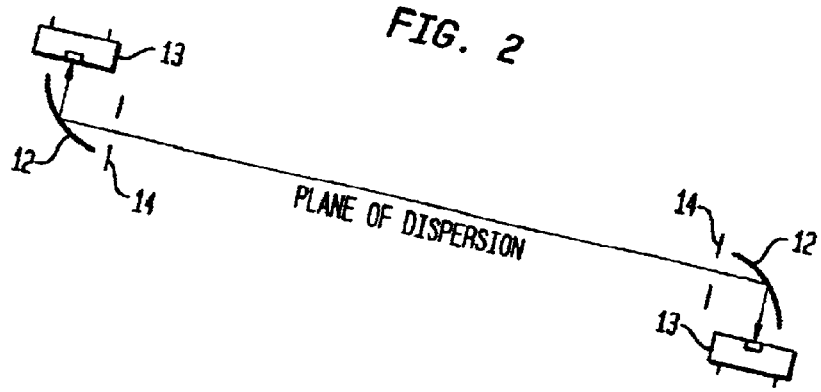
FIG. 2 is a schematic cross section through the cylindrical deflection mirrors

The detection of spectral information on the one hand is carried out in a conventional way on discrete spectral lines by means of appropriately placed exit slits and photomultiplier tubes. On the other hand, according to the invention, a broadband spectral detection is achieved with solid-state sensors. It concerns customary linear array sensors which are normally used in application other than spectrometry, having pixel numbers of several thousands and pixel dimensions in the 10–100 μm range. If necessary, the sensors are additionally sensitized for wavelengths below 360 nm by means of a fluorescence coating. In conjunction with a cylindrical mirror [12] (FIG. 2) each array [13] form a detector unit which can be mounted in different positions relative to the plane of dispersion. The length of the cylindrical mirror approximately meets the light sensitive length of the array. The cylinder axis of the mirror is aligned tangential to the Rowland circle. The mirrors positions are transferred a certain distance from the focal curve towards the circle center. Here, the cylindrical mirrors act in two ways (claim 6):

(a) The sections of the focal curve in the range of a mirror(s) are cut out of the Rowland circle arc and transferred by 90° (upwards or downwards) to the sites of the arrays. The Rowland image formation is thereby not affected at all. In this respect a plane mirror would have the same effect.

(b) The cylindrical mirrors focus radiation perpendicular to the direction of propagation. Masks [14] in front of the mirrors determine the effective vertical zone for focusing. Proper dimensioning of the masks ensure that the arrays detect only radiation close to the dispersion plane where the image quality is best and, correspondingly, the spectral resolution is best.

Through alternating deflection upwards or downwards the cylindrical mirrors of adjacent detector units can be brought, into contact in spite of the large space required for the sensor chip carrier "packages".

The detection of the spectrum can further be optimized by adaptation of the mirror shape to the respective position on the Rowland circle. For this, the side edges of the minors are cut so that they appear vertical looking from the direction of the grating i.e. they appear parallel to the grating grooves. As a result the spectral information is clearly separated and assigned between adjacent detector units and the units can be pushed against each other for a complete spectrum determination, virtually without gaps (claim 7).

The spectrometer setup described above shall be illustrated in an example (FIG. 3). The radiation of a source enters the spectrometer through the entrance silt [6] and illuminates the first diffraction grating [1]. The zero order diffracted beam is focussed onto the tilled plane mirror [8] and reflected onto the second diffraction grating [2].

Figure 3:
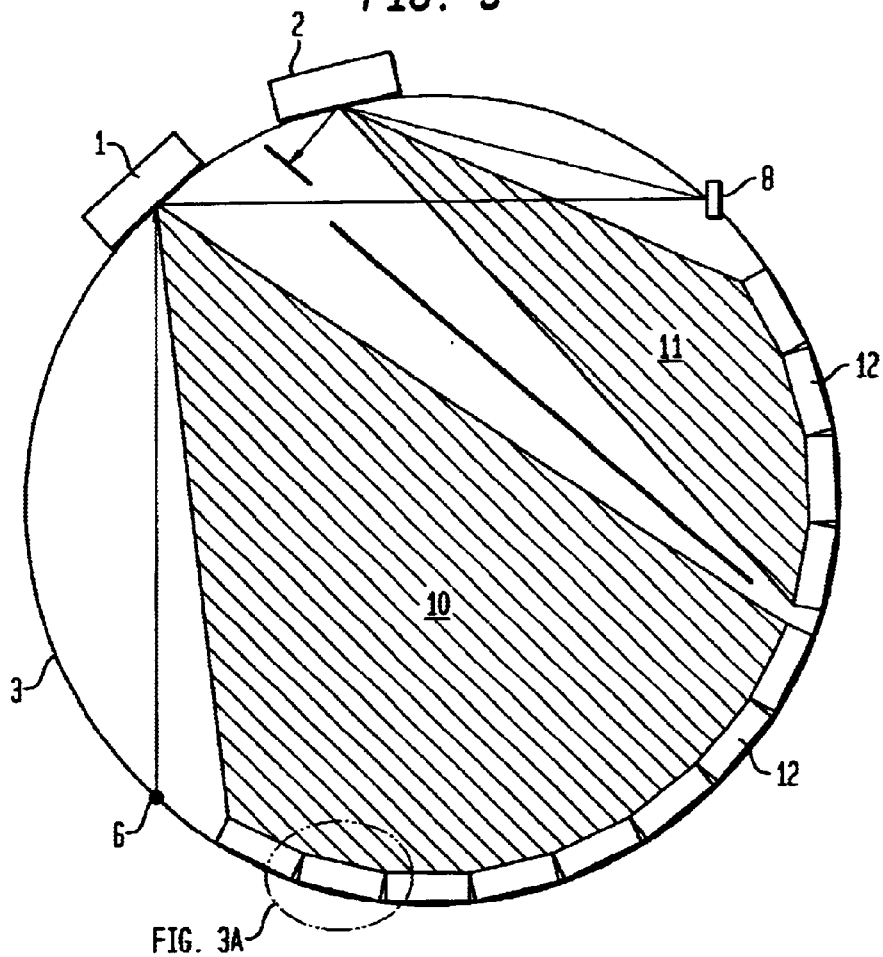
FIG. 3 is a schematic plane view showing one embodiment of the invention in use.
Figure 3A:
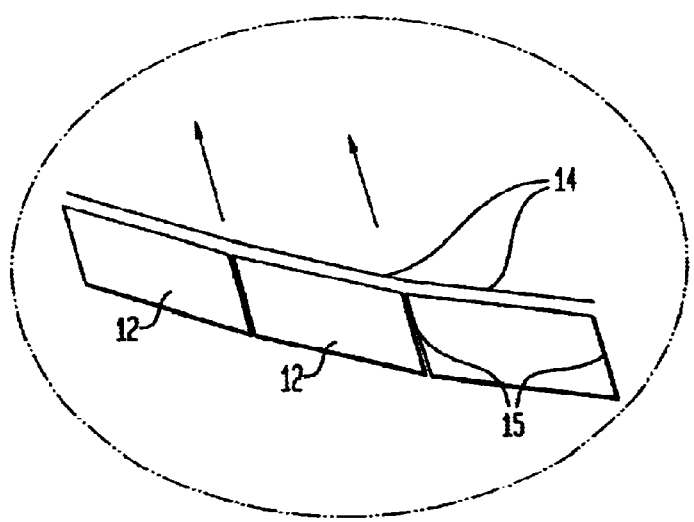

The entrance angles for both gratings have opposite signs (i.e. major aberrations in the image formation of the second grating are compensated). A dividing light absorbing sheet restricts the emission of each of the gratings in a way that two separated arc segments on the Rowland circle are reserved for the respective grating operation ranges [10, 11]. The detector units are lined up tangential following the Rowland circle—for clarity only the cylindrical mirrors are shown in FIG. 3. Regardless of whether the mirrors reflect just upwards or downwards, the mirror edges [15] align with the direction of the grating (i.e. looking from the grating position the mirror edges appear perpendicular to the dispersion plane). In this way there is no overlap of spectral information assigned to adjacent arrays and the detector units are close to each other virtually without gaps.

Further on, there are masks indicated [14] in front of the detector units which set the vertical focusing range of the cylindrical minors.

The introduced spectrometer design has already been realized technically and the features described above were verified with appropriate measurements.

What is claimed is:

1. A simultaneous Paschen-Runge grating optical spectrometer comprising:

a single entrance slit (6) through which a beam of radiation enters said spectrometer at a given entrance angle (7);

a first concave diffraction grating (1), for producing a zero order focused diffracted beam from said beam of radiation;

a tilted mirror (8) for reflecting said focused diffracted beam;

a second concave diffraction grating (2) for receiving said reflected beam;

a plurality of detecting means far detecting spectral information, chosen from the group consisting of solid state linear array sensors and photomultiplier tubes, and wherein said first and said second diffraction gratings have the same radius of curvature, and are mounted tangentially on a Rowland circle such that their focal curves are congruent (3), and wherein the diameter of said Rowland circle is equal to said radius of curvature of said diffraction gratings.

2. The spectrometer of claim 1 wherein said entrance angle of said first grating (7), and the angle between said first and second gratings (5) are chosen to allow different spectral ranges with different spectral resolutions to be imaged simultaneously on any sections of the Rowland circle arc which are not occupied by the gratings themselves.

3. The spectrometer of claim 1 wherein the entrance angles of said first (7) and said second (9) gratings have opposite signs to cause considerable compensation of aberrations within the image formation of said second grating (9).

4. The spectrometer of claim 1 wherein through suitable choice of said entrance angle of said fast grating (7) and said angle between said first and said second grating (5) the spectral range of operation of the two gratings can be divided such that the radiation used in the second grating is of longer wavelength than the critical wavelength of the first grating, the radiation therefore being diffracted only in zero order.

5. The spectrometer of claim 1 having a dispersion plane and wherein a plurality of cylindrical mirrors are mounted tangential to the Rowland circle, each of said cylindrical mirrors simultaneously causing a predetermined section of the fowl curve to be imaged either above or below said dispersion plane.

6. The spectrometer of claim 5 wherein each of said cylindrical mirrors has angular cut edges, said edges appearing, observed from the grating position, to be perpendicular to the dispersion plane, and wherein said cylindrical mirrors are arranged such that each of said cylindrical mirrors that deflects the radiation to a focus perpendicularly above the dispersion plane is placed adjacent to at least one of said cylindrical mirrors that deflects the radiation to a focus perpendicularly below said dispersion plane.

7. A simultaneous Paschen-Runge grating optical spectrometer comprising:

a single entrance slit (6) through which a beam of radiation enters said spectrometer at a given entrance angle (7);

a first concave diffraction grating (1), for producing a zero order focused diffracted beam from said beam of radiation;

a tilted mirror (8) for reflecting said focused diffracted beam;

a second concave diffraction grating (2) for receiving said reflected beam;

a plurality of detecting means for detecting spectral information, chosen from the group consisting of solid state linear array sensors and photomultiplier tubes, and wherein said first and said second diffraction gratings have the same radius of curvature, and are mounted tangentially on a single Rowland circle, such that a normal to said first diffraction grating intersects a normal to said second diffraction grating at said single Rowland circle's center, thereby making their focal curves congruent (3) and causing said first diffraction grating and said second diffraction grating to both simultaneously focus on said single Rowland circle and wherein the diameter of said Rowland circle is equal to said radius of curvature of said diffraction gratings.

8. The spectrometer of claim 7 wherein said entrance angle of said first grating (7), and the angle between said first and second gratings (5) are chosen to allow different spectral ranges with different spectral resolutions to be imaged simultaneously on any sections of the Rowland circle arc which are not occupied by the gratings themselves.

9. The spectrometer of claim 7 wherein the entrance angles of said first (7) and said second (9) gratings have opposite signs to cause considerable compensation of aberrations within the image formation of said second grating (9).

10. The spectrometer of claim 7 wherein through suitable choice of said entrance angle of said first grating (7) and said angle between said first and said second grating (5) the spectral range of operation of the two gratings can be divided such that the radiation used in the second grating is of longer wavelength than the critical wavelength of the first grating, the radiation therefore being diffracted only in zero order.

11. The spectrometer of claim 7 having a dispersion plane and wherein a plurality of cylindrical mirrors are mounted tangential to the Rowland circle, each of said cylindrical mirrors simultaneously causing a predetermined section of the focal curve to be imaged either above or below said dispersion plane.

12. The spectrometer of claim 11 wherein each of said cylindrical mirrors has angular cut edges, said edges appearing, observed from the grating position, to be perpendicular to the dispersion plane, and wherein said cylindrical mirrors are arranged such that each of said cylindrical mirrors that deflects the radiation to a focus perpendicularly above the dispersion plane is placed adjacent to at least one of said cylindrical mirrors that deflects the radiation to a focus perpendicularly below said dispersion plane.

* * * * *